United States Patent [19]
Neal, Jr. et al.

[11] Patent Number: 5,234,193
[45] Date of Patent: Aug. 10, 1993

[54] ROTARY PLUG VALVE WITH SEAT SEAL

[75] Inventors: Leonard D. Neal, Jr.; John H. Thomas, both of Jacksonville, Ala.

[73] Assignee: Parker-Hannifin Corporation, Cleveland, Ohio

[21] Appl. No.: 831,030

[22] Filed: Feb. 3, 1992

[51] Int. Cl.⁵ ........................ F16K 25/00; F16K 5/04; F16K 5/18
[52] U.S. Cl. .................... 251/175; 251/309; 251/317
[58] Field of Search ............... 137/315; 251/159, 160, 251/172, 175, 192, 309, 312, 314, 317, 900, 168

[56] References Cited

U.S. PATENT DOCUMENTS

| | | | |
|---|---|---|---|
| 2,604,293 | 7/1952 | Phillips | 251/175 |
| 2,844,353 | 7/1958 | Gurries | 251/317 |
| 2,852,226 | 9/1958 | Wheatley | 251/317 |
| 2,970,805 | 2/1961 | Pool | 251/317 |
| 3,033,226 | 5/1962 | Allen | 137/315 |
| 3,787,028 | 1/1974 | Semon | 251/317 |
| 4,015,816 | 4/1977 | Semon | 251/317 |
| 4,262,880 | 4/1981 | Danko et al. | 251/317 |
| 4,611,626 | 9/1986 | Logsdon | 251/317 |
| 4,982,760 | 1/1991 | Mustaklem | 251/317 |
| 5,037,067 | 8/1991 | Ray | 251/900 |

FOREIGN PATENT DOCUMENTS 1048746 12/1953 France .................... 251/317

*Primary Examiner*—George L. Walton
*Attorney, Agent, or Firm*—Christopher H. Morgan

[57] ABSTRACT

An improved rotary plug valve of the type having a valve body with a fluid inlet conduit and a fluid outlet conduit therein has a rotary plug disposed for rotation in the valve body between an open position and a closed position. In the closed position the plug has a seat seal disposed in a groove in the cylindrical surface thereof which seat seal extends adjacent and surrounds the fluid inlet conduit to seal the inlet conduit against fluid flow. The groove in the plug has a radially inner wall, a radially outer wall and a base wall. The base wall extends at an angle so that the radially outer wall extends more deeply into the plug than the radially inner wall. Preferably the groove and the seat seal have an annular, cylindrical shape. Also preferably the seat seal has a shape so that a pressure space is formed adjacent the base wall of the groove and a gap is formed adjacent the radially inner wall of the groove. Fluid pressure in these urge the seat seal into sealing positions. Also preferably the seat seal has a greater curvature in the direction of its leading and trailing edges, when not under pressure, than the surface of the plug so that the seat seal is less prone to cutting as it moves over the inlet opening.

13 Claims, 5 Drawing Sheets

ROTARY PLUG VALVE WITH SEAT SEAL

BACKGROUND OF THE INVENTION

1. Field of the Invention

The present invention relates in general to fluid control valves and in particular to rotary plug valves. Still more particularly, the present invention relates to rotary plug valves with seals which surround the fluid seal connection between the valve body and the plug member.

2. Description of the Prior Art

Rotary plug valves are well known in the valve art. A rotary plug valve includes a valve body with a fluid passageway therethrough. Fluid flow through the passageway is controlled by a rotary plug member which extends across the passageway and rotates between a closed position in which the plug member obstructs and seals the fluid passageway against fluid flow and an open position in which a fluid path in the plug member is connected to allow fluid flow through the fluid passageway of the valve body.

In rotary plug valves as in all valves it is necessary to provide seals to protect against leakage. These seals usually include o-ring elastomeric seals which extend around the cylinder of the plug member on opposite sides of the fluid path which extends through the plug member. These seals resiliently bear on the valve body and the plug member to seal the leak path necessarily formed to allow the plug member to rotate in the valve body between the open and closed position. This leak path would otherwise extend to the exterior of the valve body.

In some rotary plug valves, an additional elastomeric seal is provided between the plug member and valve body, which seal surrounds the valve body inlet whenb the plug member is closed. The purpose of this seal is to seal the leak path from the inlet to the outlet of the valve body. It is in addition to the sealing action of the metal to metal contact between the plug member and valve body when the plug member is in the closed position. This seal also seals the leak path to the exterior of the valve body.

Because of the configuration of the valve body and plug member, the inlet-surrounding seal must be carried by the plug member. This means that the plug member moves this seal across the inlet opening of the valve body as the plug member is rotated between the open and closed positions. This causes the seal to be pinched between the metal parts of the valve body and plug member. This can result in cutting or tearing of the seal which can destroy or reduce its effectiveness.

In some applications it is necessary to cycle a rotary plug valve at high differential pressures. Under these conditions it is possible to blow out the inlet-surrounding seal. This problem arises in part because the inlet-surrounding seals must generally have a durometer of less than about 80 in order to be sufficiently resilient to bear against the valve body with sufficient pressure to seal.

The inlet-surrounding seal most commonly used is an elastomeric o-ring. This o-ring is held in a groove machined in the exterior of the cylinder which forms the plug member. Machining this groove in the form of a ring on an exterior arc of the cylinder is obviously a difficult process because the groove is not disposed in a plane and can not be formed by a tool which rotates about the axis of the groove.

Assembly of the o-ring, inlet-surrounding seal is also difficult. The o-ring has a naturally planar shape and must be folded and held in the cylindrical arc groove of the plug member during the assembly process. The plug member is machined to fit very closely within the valve body and this further increases the difficulty of assembly.

In order to prevent pinching of the o-ring, inlet-surrounding seal as it moves across the inlet opening of the valve body it is necessary to provide a complex chamfer on the inlet open edges. This chamfer is described in U.S. Pat. No. 4,262,880. Since the inlet opening edges are located inside the valve body this chamfer also requires a difficult machining process.

SUMMARY OF THE INVENTION

It is accordingly an object of the present invention to provide an improved rotary plug valve. It is also an object of the present invention to provide this improved rotary plug valve with an improved inlet-surrounding seal. It is further an object to provide such an improved rotary plug valve with improved sealing function and improved resistance to seal damage.

It is still further an object of the present invention to provide an improved rotary plug valve with an inlet-surrounding seal which is more resistant to seal blow out when the valve is cycled at high pressure differentials. It is yet further an object of the present invention to provide such a valve which is simpler to manufacture and assemble.

In accordance with these objects the present invention provides an improved rotary plug valve of the type having a valve body with a fluid inlet conduit and a fluid outlet conduit extending therein. A rotary cylindrical plug is disposed with the body and extends between the fluid inlet conduit and the fluid outlet conduit. The cylindrical plug has a fluid path extending through the plug so that the plug is rotatable in the body between an open position and a closed position. In the open position the fluid path of the plug joins the fluid inlet conduit and the fluid outlet conduit of the body allowing fluid flow therethrough. In the closed position the plug separates and seals the fluid inlet conduit from the fluid outlet conduit to prevent the fluid flow therethrough. The cylindrical plug has a cylindrical exterior surface.

The improvement of the present invention includes a groove formed in the cylindrical surface of the plug which extends around and adjacent inlet conduit of the body when the plug is disposed in the closed position. The groove has a radially outer wall, a radially inner wall, and a base wall extending between the radially inner wall and the radially outer wall. The base wall extends at an angle so that the radially outer wall extends more deeply into the plug valve than the radially inner wall.

A seat seal is disposed within the groove and bears against the valve body for sealing the inlet conduit of the valve body against fluid flow when the plug is disposed in a closed position.

The cylindrical plug has an axis of rotation and, preferably, the groove in which the seat seal is disposed has a shape formed by a trepan tool rotating about an axis transverse to the axis of rotation of the cylindrical plug. Thus, the base wall of the groove has a shape of rotation about the axis of rotation of the trepan tool.

The seat seal preferably has a generally planar, annulus base wall which is disposed adjacent said base wall of said groove in said plug. The seat seal also has a generally cylindrical section, annulus face wall which bears against the valve body and surrounds the inlet conduit of the valve body when the plug is disposed in the closed position.

To improve the seat seal's resistance to blow out when the valve is cycled at high pressure differential, the seat seal is preferably formed of a material having a durometer of between 85 and 95. Despite this higher durometer the seat seal can seal with sufficient pressure against the valve body because the seat seal is urged toward the valve body by fluid pressure from the inlet. This is achieved by the angle of the base wall and the planar, annulus shape of the seat seal causing a pressure opening between the base wall of the groove and the base wall of the seat seal. This pressure opening is communicated with the inlet conduit when the plug is disposed in the closed position.

The curvature of the face wall of the seat seal is preferably greater than the curvature of the cylinder surface in which the groove is formed. This greater curvature is oriented so that the leading and trailing edges of the seat seal as the seat seal is rotated are approximately flush with the surface of the plug when the seat seal is not urged toward the valve body by fluid pressure at the base wall of the seat seal. The portions of the face wall which are ninety degrees from the leading and trailing edges extend outwardly from the surface of the plug and bear against the valve body with greatest pressure. In this manner, the face wall of the seat seal is not pinched, cut or abraded when the seat seal moves over the inlet conduit of the valve body. This can be achieved without the use of a more difficult complex chamfer on the edges of the valve body inlet conduit.

For a further understanding of the invention and further objects, features and advantages thereof, reference may now be had to the following description taken in conjunction with the accompanying drawings.

DESCRIPTION OF PREFERRED EMBODIMENTS

Figure 1:
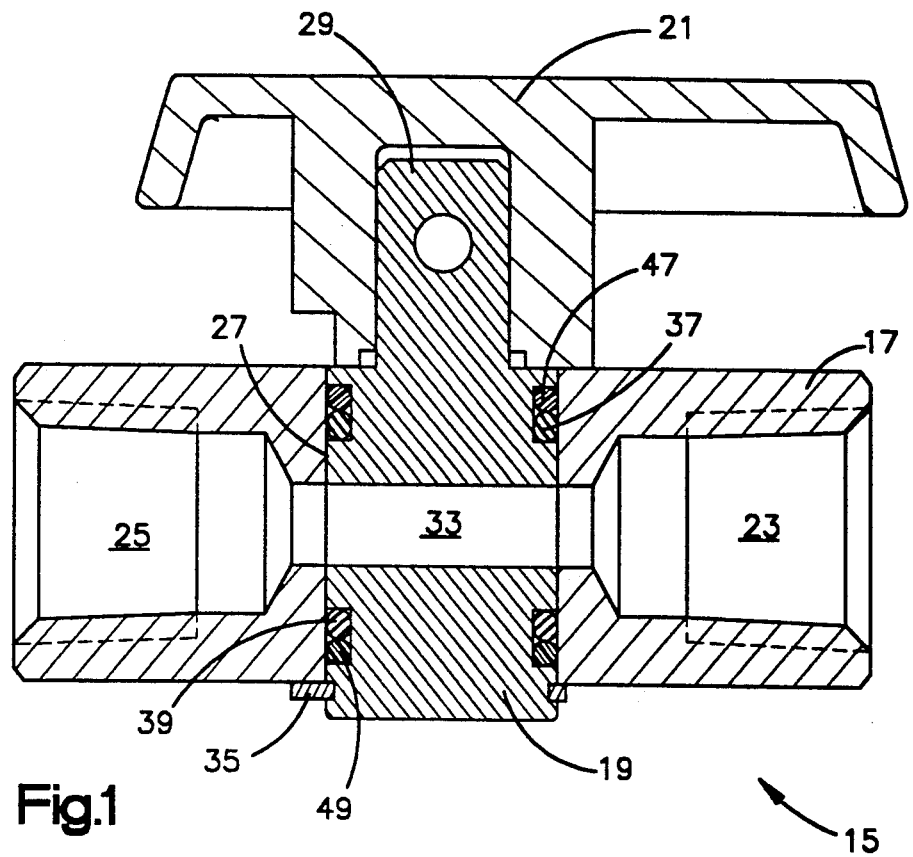
FIG. 1 is a cross sectional view of the rotary plug valve of the present invention taken longitudinally through the valve with the valve in the open position.
Figure 2:
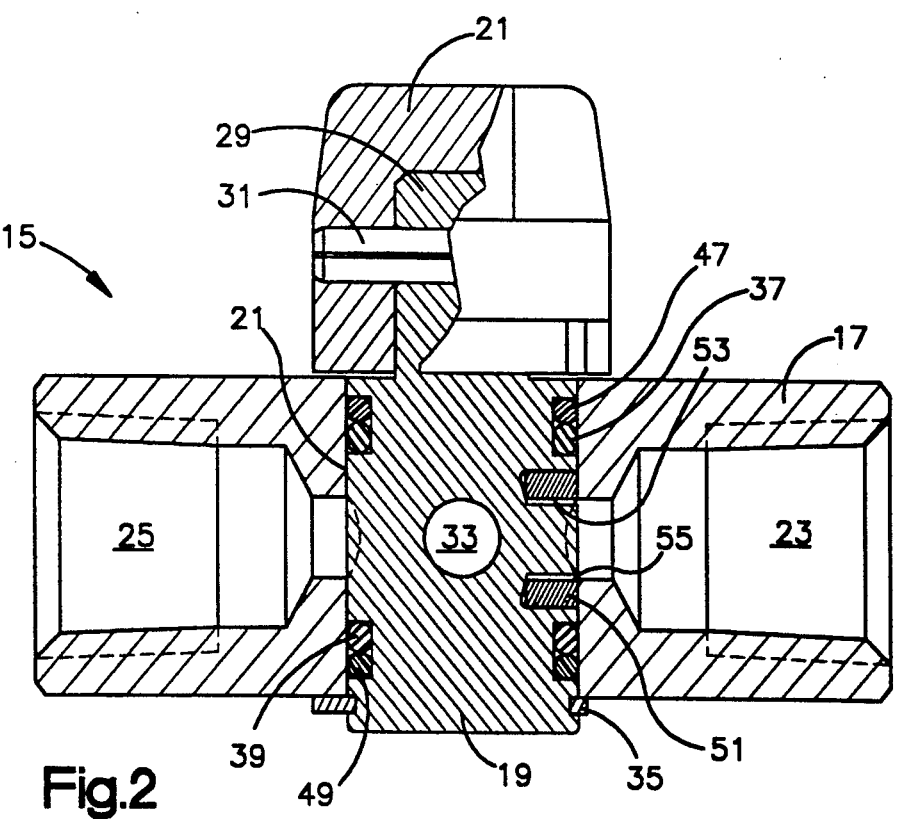
FIG. 2 is a cross sectional view of the rotary plug valve of FIG. 1 taken longitudinally through the valve with the valve in the closed position.
Figure 5:
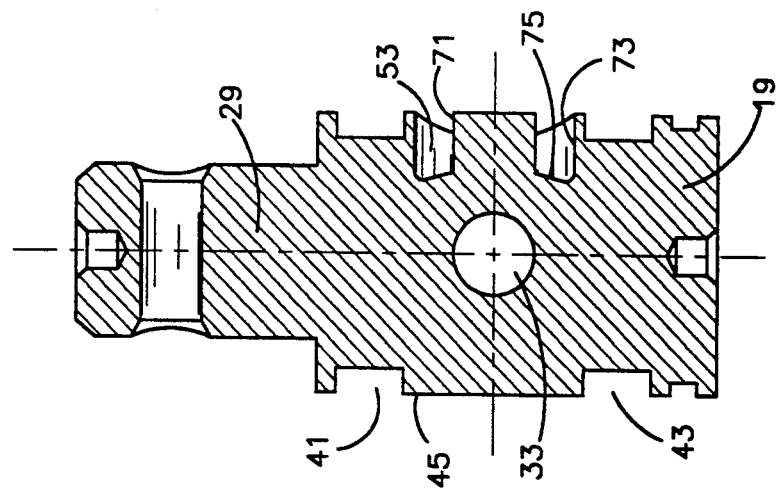
FIG. 5 is a cross sectional view of the plug shown in FIG. 3 taken along the lines shown in FIG. 3.
Figure 4:
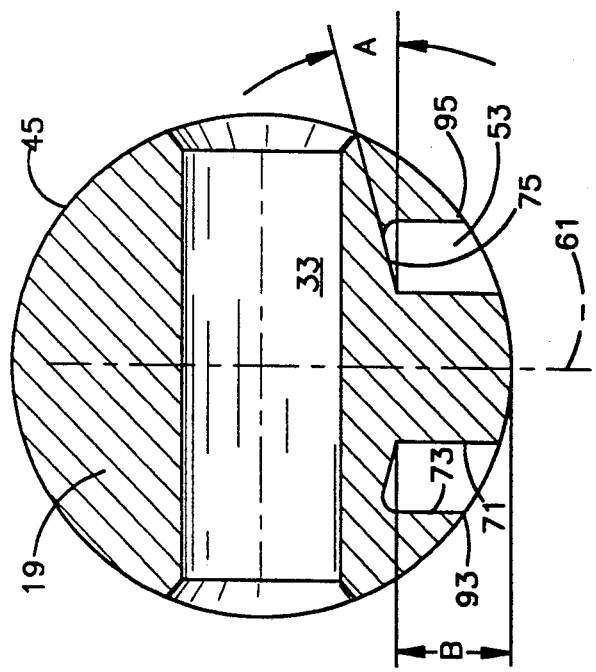
FIG. 4 is a cross sectional view of the plug shown in FIG. 3 taken along the lines shown in FIG. 3.
Figure 3:
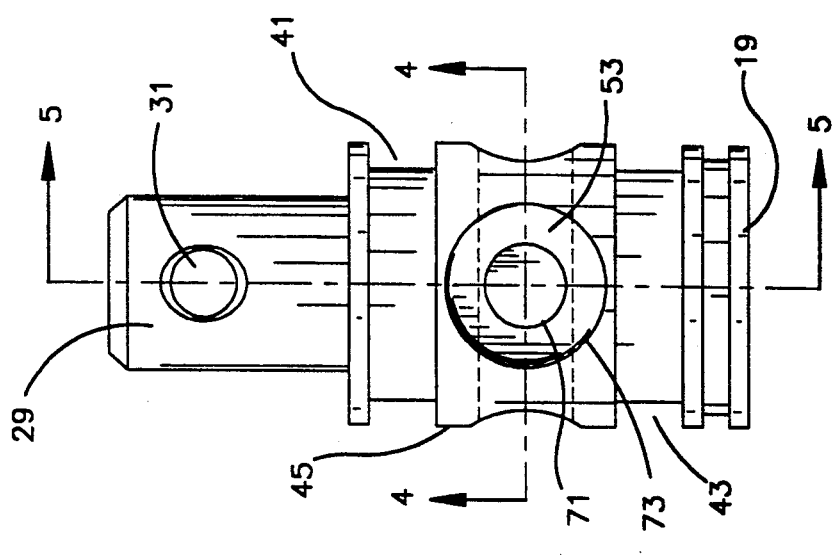
FIG. 3 is a side view of the plug portion of the valve shown in FIG. 1 without the seat seal inserted.
Figure 9:
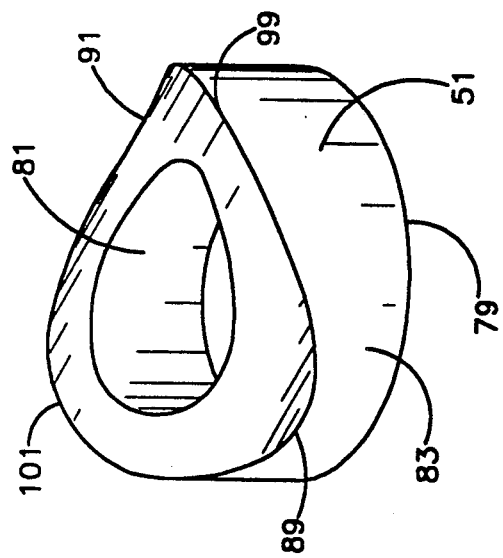
FIG. 9 is a perspective view of the seat seal shown in FIG. 6.
Figure 8:
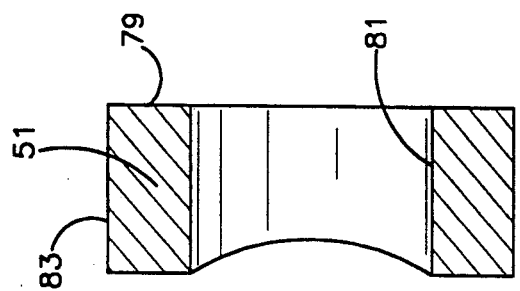
FIG. 8 is a cross sectional view of the seat seal shown in FIG. 6 taken along the lines shown in FIG. 6.
Figure 6:
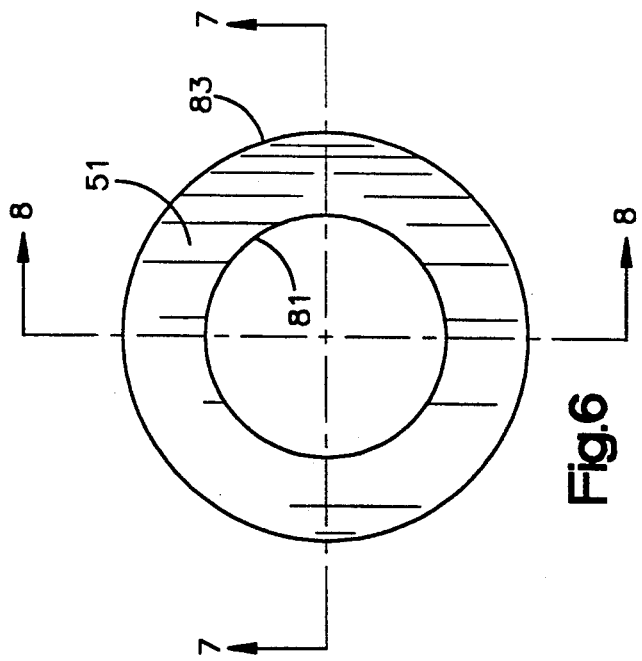
FIG. 6 is a plan view of the seat seal shown in FIG. 1.
Figure 7:
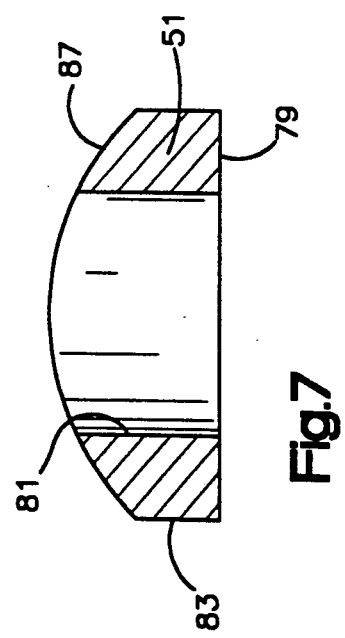
FIG. 7 is a cross sectional view of the seat seal shown in FIG. 6 taken along the lines shown in FIG. 6.

Referring now to FIGS. 1 through 12, the improved rotary plug valve of the present invention is shown at 15. The valve 15 includes a valve body 17, a plug 19 and a handle 21. The valve body has an inlet conduit 23 and an outlet conduit 25. These conduits have threaded sections inside their opposite ends to allow threaded pipe or tubing connections to be made to join the valve in a pipe or tubing system. Other types of end connections could be used. The purpose of the valve is to control the flow of fluid between the pipe or tubing so connected.

The plug 19 has a cylindrical shape and fits closely within a cylindrical opening 27 in the valve body 17. Handle 21 is fixed to a neck portion 29 of plug 19 by a pin 31. Manual operation of the handle 21 allows the plug 19 to be rotated with respect to valve body 17 between an open position shown in FIG. 1 and a closed position shown in FIG. 2. The open position is 90 degrees of rotation from the closed position and stops are provided on the handle 21 and valve body 17 to prevent rotation of the plug 19 more than the 90 degrees of rotation between the open position and the closed position.

The plug 19 has a cylindrical fluid conduit 33 extending therethrough which connects the inlet conduit 23 and the outlet conduit 25 when the plug 19 is disposed in the open position. When in the closed position, fluid conduit 33 no longer connects the inlet conduit 23 and the outlet conduit 25 and the plug 19 sealingly separates the inlet conduit 23 and the outlet conduit 25 to prevent fluid flow through the valve between conduits 23 and 25.

Plug 19 is held in its rotary position in valve body 17 by a snap ring 35 and handle 21. Snap ring 35 prevents axial movement of the plug 19 with respect to the valve body 17 toward the handle 21 and handle 21 prevents axial movement of the plug 19 with respect to the valve body 17 toward the snap ring 35.

A pair of elastomeric o-rings 37 and 39 extend circumferentially about plug 19 on opposite sides of fluid conduit 33 to seal the valve 15 against external leakage of fluid. These o-rings 37 and 39 are provided to seal the leak path which would otherwise be present between the valve body 17 and the rotary plug 19. The o-rings 37 and 39 are disposed in grooves 41 and 43, respectively, which extend circumferentially in the cylindrical surface 45 of plug 19. O-ring 37 and groove 41 are disposed between conduit 33 and handle 21. O-ring 39 and groove 43 are disposed between conduit 33 and snap ring 35.

Because the o-rings 37 and 39 seal during rotation of plug 19 in valve body 17, it is desirable to reduce friction on the o-rings 37 and 39 which tends to wear or abrade the o-rings 37 and 39. This can be achieved by a pair of backup rings 47 and 49. The backup rings 47 and 49 are formed of a low friction material such as a polyfluorocarbon material. A preferred example is polytetrafluoroethylene, often referred to as PTFE. The backup rings 47 and 49 extend in the grooves 41 and 43, respectively, on opposite sides of the o-rings 37 and 39. The backup rings 47 and 49 have a generally rectangular cross section and have approximately the same radial thickness as the depth (radial dimension) of the groove in which they are disposed. The backup rings 47 and 49 are split to allow assembly of the rings in the grooves 41 and 43.

The o-rings 37 and 39 are urged against the backup rings 47 and 49, respectively, by fluid pressure from within the valve 15. This fluid pressure also urges the o-rings against the valve body 17. The low friction surfaces of the backup rings 47 and 49 reduce the wear and abrasion of the o-rings 37 and 39 as the plug 19 is rotated between the open position and the closed position. This feature of the valve 15 is described in more detail in our copending U.S. patent application entitled Rotary Plug Valve with Low Friction Backup Ring filed of even date herewith and the description thereof is incorporated herein by reference.

The improvement of the present invention relates to sealing the inlet conduit 23 against fluid leakage when the valve 15 is in the closed position. This sealing function is achieved by a seat seal 51 disposed in a groove 53 in plug 19. The reference to conduit 23 as an inlet is made because in many valve applications there is clearly an orientation of high pressure to low pressure in the piping or tubing system. When this is a high pressure differential orientation, sealing the inlet or high pressure side is especially desired. Valve 15 is suited for such an application since it provides the seat seal 51 for the inlet conduit 23. Valve 15 is designed for such high pressure differential applications and, therefore, a seat seal is provided for the inlet conduit 23 but not for the outlet conduit 25. If desired, a seat seal and groove of similar construction could be provided to seal the outlet conduit 25 as well. In this case, it might be inappropriate to refer to the conduits 23 and 25 as inlets and outlets since the direction of flow might be reversible.

One of the important features of the seat seal 51 and the groove 53 is the manner in which fluid pressure is communicated from the inlet conduit 23 through the groove 53 to urge the seat seal against the valve body 17 surrounding and adjacent the edge 55 of the inlet conduit 23. This is achieved by the shape of the groove 53 and seat seal 51 and the position relationship of these to the inlet 23 when the valve is in the closed position.

Figure 14:
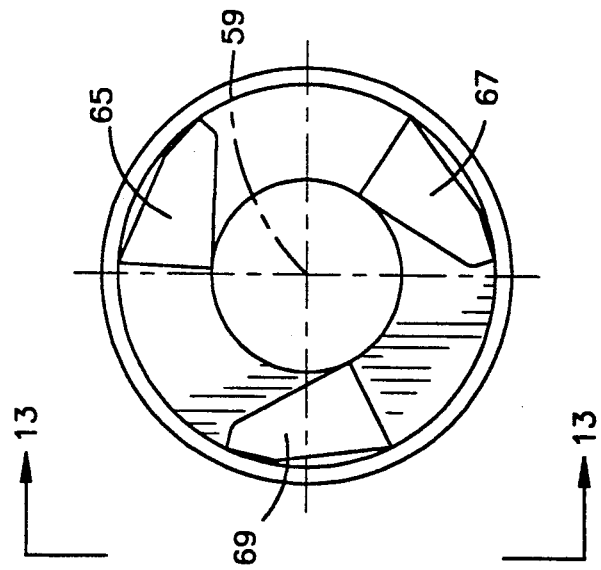
FIG. 14 is an end view of the trepan tool shown in FIG. 13 viewed from the right end as shown in FIG. 13.
Figure 13:
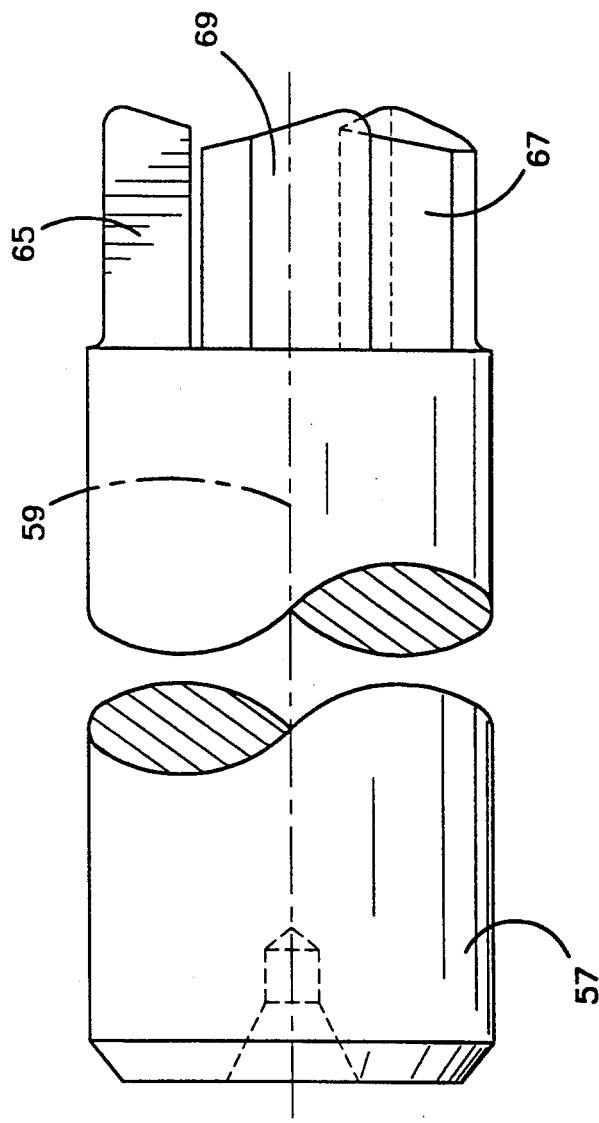
FIG. 13 is a side view of a trepan tool of the type used to form the groove shown in FIG. 1.

The groove 53 is formed by use of a trepan tool 57 shown in FIGS. 13 and 14. The trepan tool 57 is rotated about its axis 59 and advanced into the plug 19 along an axis 61 which is transverse to the axis of rotation 63 of the plug 19. Thus, axis 61 is the center of the groove 53. This method of formation causes the groove 53 to have an annular shape of rotation. Three cutting teeth 65, 67 and 69 on the trepan tool determine the annular shape of the groove 53.

The groove 53 has a radially inner wall 71, a radially outer wall 73, and a base wall 75. The radially outer wall 73 extends more deeply into the plug 19 than inner wall 71. By more deeply into plug 19 it is meant that the wall 73 extends further relative to the annulus of the groove 53 (parallel to the axis 61). It is not meant more deeply when measured relative to the surface of the plug since the cylindrical surface of the plug is transverse to the annulus of the groove 53. This greater depth occurs because the teeth 65, 67, and 69 have radially outer cutting ends which extend further than their radially inner cutting ends. As a result, the base well 75 of the groove 53 has an angle A relative to an imaginary base plane B extending at a right angle to axis 61 at the depth of radially inner wall 71. Preferably this angle is approximately 15 degrees.

The purpose of the angled base wall 75 of groove 53 is to provide a pressure space or opening 77 beneath the seat seal 51. The seat seal 51 has a generally planar, annulus base wall 79 which, when the seat seal is disposed in the groove 53, extends parallel to the imaginary base plane B shown in FIG. 4. Because of the angle of the base wall 75 of the groove relative to the base wall 79 of the seat seal, the pressure space 77 extends beneath the seat seal 51.

Seat seal 51 has a radially inner wall 81 and a radially outer wall 83. The radius of wall 83 is such that this radially outer wall fits closely within the radially outer wall 73 of groove 53. In contrast the radius of radially inner wall 81 is larger than the radius of radially inner wall 71 of groove 53. This results in a gap 85 between the radially inner wall 71 of groove 53 and the radially inner wall 81 of the seat seal 51. Fluid pressure in this gap 85 urges the seat seal 51 against the radially outer wall 73 of groove 53. In addition, fluid pressure in gap 85 is communicated to the pressure space 77 which urges the seat seal 51 against the valve body adjacent and surrounding the inlet conduit edge 55.

The radius of the radially inner wall 81 of seat seal 51 is approximately equal to or slightly larger than the radius of the edge 55 of the inlet conduit 23. This allows fluid pressure from the inlet conduit 23 to be communicated to the gap 85 when the valve 15 is in the closed position shown in FIG. 2. It also allows the seat seal 51 to bear against the valve body adjacent and surrounding the edge 55 of inlet conduit 23.

As can be seen by this description, high pressure fluid from inlet conduit 23 urges the seat seal 51 in a manner which seals the fluid in inlet conduit 23. This is in contrast to conventional inlet-surrounding seals which rely most significantly on the resiliency of the seal material to provide the sealing pressure.

Seat seal 51 has a face wall 87 which bears against the valve body 17 adjacent and surrounding the inlet conduit edge 55. When the seat seal 51 is under pressure and the valve 15 is disposed in the closed position shown in FIG. 2, this face wall 87 has the same shape as the cylindrical valve body opening against which it is pressed. This is the same cylindrical shape of the surface 45 of plug 19. However, when the seat seal is not under pressure, the curvature of the face wall 87 of the seat seal 51 has a greater curvature than the curvature of the plug surface 45 and the valve body opening 27. The orientation of the greater curvature is such that the leading edge 89 and the trailing edge 91 of the seat seal 51 with respect to the rotation of the plug 19 are approximately flush with the leading and trailing edges 93 and 95 of the groove 53. By this means, the seat seal is not pinched or cut as it moves over the inlet conduit edge 55.

Figure 12:
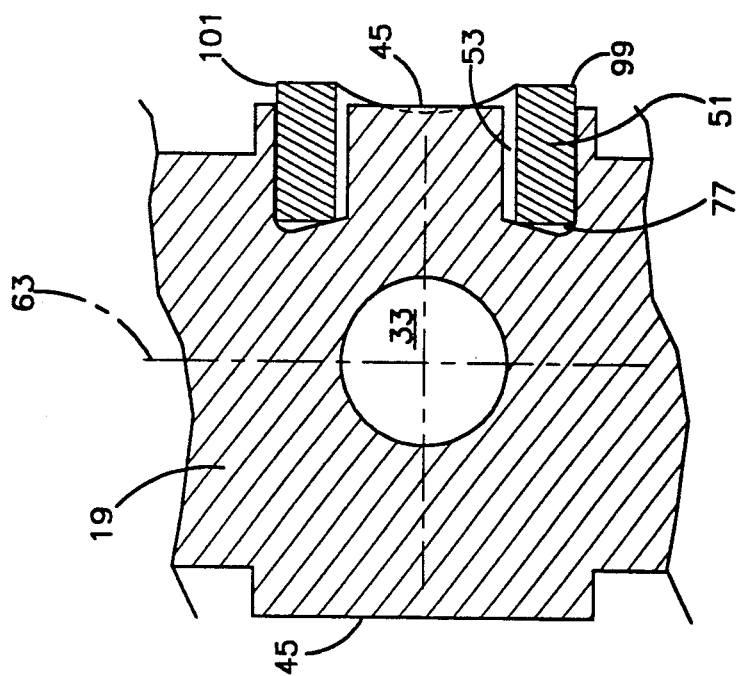
FIG. 12 is a cross sectional view of a portion of the plug shown in FIG. 10 taken along the lines shown in FIG. 10.
Figure 11:
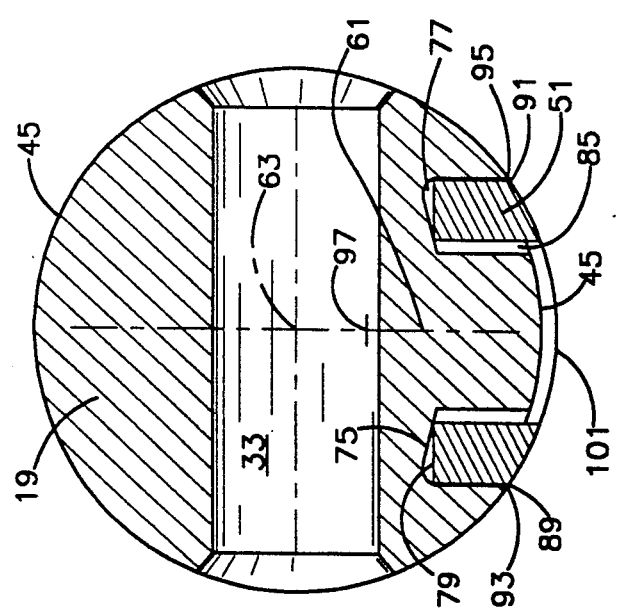
FIG. 11 is a cross sectional view of the plug shown in FIG. 10 taken along the lines shown in FIG. 10.
Figure 10:
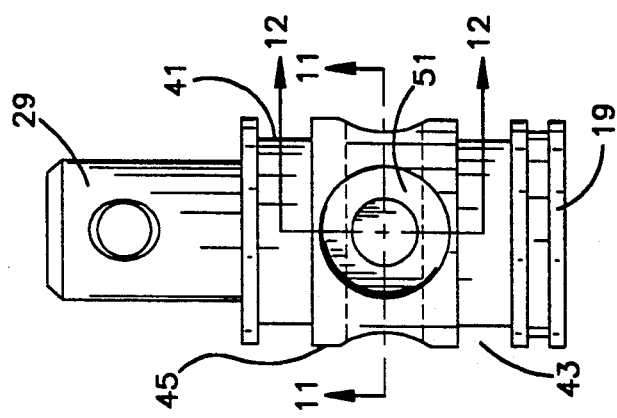
FIG. 10 is a side view of the plug shown in FIG. 1 with the seat seal inserted and the plug removed from the valve.

The greater curvature and the orientation of the curvature of the seat seal 51 can be seen in FIGS. 11 and 12 which illustrate the seat seal disposed in the groove 53 while the plug 19 is not inserted in the valve body 17. This shows the seat seal 51 when it is not under pressure from its position in the valve body or from fluid in the valve body. Of course, the radius of curvature of a circumference of the plug 19 extends to axis 63. The radius of curvature of the seat seal, taken in this same plane, extends to point 97. Thus the radius of curvature of the seat seal taken in this plane is smaller than the radius of curvature of the surface of the plug. The midportions 99 and 101 of the face wall 87 of the seat seal 51 are 90 degrees from the leading and trailing edges 89 and 91. The midportions 99 and 101 extend out from the plug surface 45 when the seat seal in not under pressure.

When the plug 19 is inserted into the valve body 17 with the seat seal located in groove 53, the portions of the seat seal which extend out of the plug are compressed. The midportions 99 and 101 are compressed the most while the leading and trailing edges are compressed least or not at all. The compression therebetween is a smooth gradient. This results in an amount of pressure on face wall of the seat seal which steadily reduces in correspondence to the tendency of the pressure to cause cutting of the seat seal 51 due to its angle of encounter during rotation with the edge 55 of the inlet conduit 23.

Because of the fluid pressure sealing and the improved shape of the seat seal reducing the tendency of the seal to be pinched or cut, the seat seal 51 can be formed of elastomeric materials of higher durometer than conventional inlet-surrounding seals.

Preferably, the durometer of the seat seal 51 is in the range of from about 85 to about 95 with about 90 being most preferred. Preferred materials for the seat seal include fluorocarbon rubber compounds, ethylene-propylene rubber compounds, nitrile rubber compounds, silicone rubber compounds, and neoprene rubber compounds. These materials are capable of being molded in the form described. Each of these compounds can be formulated to provide a seal durometer in the range of about 85 to 95. The choice of materials may be influenced by the fluids to be conducted in the valve. In many cases it will be desired to form the o-rings 37 and 39 of the same material as seat seal 51. However, the o-rings 37 and 39 will be formulated to have a durometer in the range of from about 65 to about 75.

The shape of the seat seal 51 is such that it is always deeper (axial dimension) than it is in radial thickness. In this manner it extends further into and is retained in groove 53 better than an o-ring or conventional inlet-surrounding seals. This, together with the higher durometer of the seat seal 51 make the seal less prone to blow out when the valve is cycled at high pressure differentials.

It can be seen that the construction of the groove 53 is much easier than forming grooves of even depth on the surface of a cylinder. Use of the trepan tool in rotary cutting of the groove is a much improved method of foprming the groove. Molding of the seal seal 51 is also relatively simple. Assembly of the valve 15 is also improved and does not require bending a planar o-ring about the inlet.

While it is not necessary to provide a large chamfer on the edge 55 of inlet 23, it is desirable to deburr the edge and to reduce its sharpness by abrasive flow machining. This will provide a slight radius to the edge which will assist the above described protection of the seat seal 51 against pinching and cutting. This results in a valve body 17 which is easier to manufacture than conventional valve bodies to be used with inlet-surrounding seals.

The above discussion of this invention is directed primarily to preferred embodiments and practices thereof. It will be readily apparent to those skilled in the art that further changes and modifications in the actual implementation of the concepts described herein can be made without departing from the spirit and scope of the invention as defined by the following claims.

What is claimed is:

1. An improved rotary plug valve of the type having a valve body with a fluid inlet conduit and a fluid outlet conduit extending thereion, a rotatable cylindrical plug disposed within the valve body and extending between the fluid inlet conduit and fluid outlet conduit, the cylindrical plug having a fluid path extending through the plug so that the plug is rotatable in the valve body between an open position in which the fluid path of the plug joins the fluid inlet conduit and fluid outlet conduit of the valve body allowing fluid flow therethrough and a closed position in which the plug separates and seals the fluid inlet conduit from the fluid outlet conduit of the valve body to prevent fluid flow therethrough; the improvement comprising:

the cylindrical plug having a cylindrical exterior surface with a groove formed in said surface which extends adjacent and around the inlet conduit of the valve body when the plug is disposed in the closed position, said groove having a radially outer wall, a radially inner wall, and a base wall which extends between the inner wall and the outer wall, said base wall extending at an angle so that the radially outer wall extends more deeply into the plug than the radially inner wall to define a pressure space;

a seat seal disposed within said groove relative to a wall portion of said seat seal that extends above and across said pressure space, and bearing against said valve body for sealing the inlet conduit of the valve body against fluid flow when the plug is disposed in a closed position, whereby fluid flow is able to communicate within said pressure space to act against said seat seal to maintain said seat seal against said valve body for effectively sealing the inlet conduit of said valve body.

2. The improved rotating plug valve of claim 1 wherein the cylindrical plug has an axis of rotation and wherein said groove has a shape formed by a trepan tool rotating about an axis transverse to the axis of rotation of the cylindrical plug.

3. The improved rotary plug valve of claim 2 wherein said seat seal has:

a generally planar, annulus base wall which extends adjacent said base wall of said groove, and a generally cylindrical section, annulus face wall which extends adjacent the exterior surface of the plug and bears against the valve body.

4. The improved rotary plug valve of claim 3 wherein said face wall of said seat seal has a leading and trailing edge relative to the direction of rotation of the plug in the valve body and a curvature in the direction of the leading and trailing edge which is greater, when said seat seal is not under pressure, than a curvature of the surface of the cylindrical plug.

5. The improved rotary plug valve of claim 4 wherein said cylindrical plug has a radius determined by a circumference extending about the plug in a plane at said groove and wherein the seat seal has a radius determined by an arc extending about the seat seal in said plane as it is seated in the plug; and wherein the radius of the plug is greater than the radius of the seat seal when the seat seal is not under pressure so that the seat seal bears against the valve body with less pressure in the area it travels over the inlet of the valve body to reduce cutting of the seat seal by the movement of the seat seal over the inlet of the valve body.

6. The improved rotary plug valve of claim 1 wherein said seat seal has a durometer in the range of from about 85 to about 95.

7. The improved rotary plug valve of claim 6 wherein said seat seal is formed of an elastomeric material.

8. The improved rotary plug valve of claim 1 wherein said groove has a shape formed by a trepan tool rotating about an axis and wherein said seat seal has a shape so that a gap is formed radially inside said seat seal between said seat seal and said radially inner wall of said groove.

9. The improved rotary plug valve of claim 8 wherein the inlet conduit of said valve body has an edge disposed adjacent said gap between said seat seal and said radially inner wall of said groove.

10. An improved rotary plug valve of the type having a valve body with a fluid inlet conduit and a fluid outlet conduit extending therein, a rotatable cylindrical plug disposed within the valve body and extending between the fluid inlet conduit and fluid outlet conduit, the cylindrical plug having a fluid path extending through the plug so that the plug is rotatable in the valve body between an open position in which the fluid path of the plug joins the fluid inlet conduit and fluid outlet conduit of the valve body allowing fluid flow therethrough and a closed position in which the plug separates and seals the fluid inlet conduit from the fluid outlet conduit of the valve body to prevent fluid flow therethrough; the improvement comprising:

the cylindrical plug having a cylindrical exterior surface with a groove formed in said surface which extends adjacent and around the inlet conduit of the valve body when the plug is disposed in the closed position, said groove having a shape of the type formed by a trepan tool rotated about an axis perpendicular to the cylindrical exterior surface of said cylindrical plug;

a seat seal disposed within said groove and bearing against said valve body for sealing the inlet conduit of the valve body against fluid flow when the plug is disposed in a closed position wherein said seat seal has a generally cylindrical section, annulus face wall which extends adjacent the exterior surface of the plug and bears against the valve body, said face wall of said seat seal having a leading and trailing edge relative to the direction of rotation of the plug in the valve body and a curvature in the direction of the leading and trailing edge which is greater, when said seat seal is not under pressure, than a curvature of the surface of the cylindrical plug such that abrasion of the leading and trailing edges is avoided during rotation of the seat seal across the inlet conduit of the valve body.

11. The improved rotary plug valve of claim 10 wherein said seat seal has a durometer in the range of from about 85 to about 95.

12. The improved rotary plug valve of claim 10 wherein said groove has a radially inner wall and wherein said seat seal has a shape so that a gap is formed radially inside said seat seal between said seat seal and said radially inner wall of said groove.

13. The improved rotary plug valve of claim 10 wherein the inlet conduit of said valve body has an edge disposed adjacent said gap between said seat seal and said radially inner wall of said groove.

* * * * *